(12) United States Patent
Diedrichs

(10) Patent No.: US 10,066,603 B2
(45) Date of Patent: Sep. 4, 2018

(54) WIND POWER INSTALLATION AND METHOD FOR INJECTING ELECTRICAL ENERGY

(71) Applicant: Wobben Properties GMBH, Aurich (DE)

(72) Inventor: Volker Diedrichs, Wardenburg (DE)

(73) Assignee: Wobben Properties GmbH, Aurich (DE)

( * ) Notice: Subject to any disclaimer, the term of this patent is extended or adjusted under 35 U.S.C. 154(b) by 564 days.

(21) Appl. No.: 14/442,050

(22) PCT Filed: Oct. 17, 2013

(86) PCT No.: PCT/EP2013/071771
§ 371 (c)(1),
(2) Date: May 11, 2015

(87) PCT Pub. No.: WO2014/072159
PCT Pub. Date: May 15, 2014

(65) Prior Publication Data
US 2015/0300320 A1   Oct. 22, 2015

(30) Foreign Application Priority Data
Nov. 12, 2012  (DE) .................. 10 2012 220 582

(51) Int. Cl.
| | | |
|---|---|---|
| *F03D 9/00* | (2016.01) | |
| *F03D 7/02* | (2006.01) | |
| *H02J 3/38* | (2006.01) | |
| *H02J 3/18* | (2006.01) | |
| *H02J 3/50* | (2006.01) | |
| *F03D 9/25* | (2016.01) | |

(52) U.S. Cl.
CPC ........... *F03D 7/0284* (2013.01); *F03D 9/255* (2017.02); *H02J 3/18* (2013.01); *H02J 3/386* (2013.01); *H02J 3/50* (2013.01); *Y02E 10/763* (2013.01)

(58) Field of Classification Search
CPC ................................ F03D 9/255; H02J 3/386
See application file for complete search history.

(56) References Cited

U.S. PATENT DOCUMENTS 5,148,362 A   9/1992  Braun et al.
7,423,412 B2  9/2008  Weng et al.
(Continued)

FOREIGN PATENT DOCUMENTS

CN   101562332 B   5/2012
CN   101026301 B   6/2012
(Continued)

OTHER PUBLICATIONS

Andersson, "Elektrische Energiesysteme: Vorlesungsteil Energieübertragung," pp. 127-147, EEH-Power Systems Laboratory, ETH Zürich, Sep. 2009.
(Continued)

*Primary Examiner* — Fritz M Fleming
(74) *Attorney, Agent, or Firm* — Seed IP Law Group LLP

(57) ABSTRACT

The present invention relates to a method for injecting electrical energy into an electrical, three-phase grid, comprising the steps of: injecting current by means of an injection unit at a grid connection point, detecting an asymmetry in the grid, in particular a negative sequence component in the grid, injecting an asymmetrical current portion into the grid for, at least, partial compensation of the detected asymmetry, with injection of the asymmetrical current portion taking place such that the injection unit behaves like a consumer.

14 Claims, 4 Drawing Sheets

(56) References Cited

U.S. PATENT DOCUMENTS

| | | |
|---|---|---|
| 7,999,418 B2 | 8/2011 | Wang et al. |
| 9,362,837 B2 * | 6/2016 | Diedrichs ................ H02J 3/26 |
| 2010/0052322 A1 | 3/2010 | Fortmann et al. |
| 2013/0141951 A1 | 6/2013 | Adloff |
| 2013/0182477 A1 | 7/2013 | De Brabandere et al. |
| 2013/0346011 A1 * | 12/2013 | Ou ........................... H02J 3/06 702/123 |

FOREIGN PATENT DOCUMENTS

| | | |
|---|---|---|
| CN | 102593852 A | 7/2012 |
| DE | 10 2006 054 870 A1 | 6/2008 |
| DE | 10 2010 029 951 A1 | 12/2011 |
| DE | 10 2011 053 237 A1 | 3/2012 |
| EP | 2209200 A2 | 7/2010 |
| RU | 2105403 C1 | 2/1998 |
| WO | 2008061698 A2 | 5/2008 |
| WO | 2008139758 A1 | 11/2008 |

OTHER PUBLICATIONS

Symmetrische Komponenten, in Wikipedia, Die freie Enzyklopädie (Wikipedia, the free encyclopedia), Version of Apr. 23, 2012, retrieved from http://de.wikipedia.org/w/index.php?title=Symmetrische_Komponenten&oldid=10236186, on May 4, 2015, 2 pages.

* cited by examiner

WIND POWER INSTALLATION AND METHOD FOR INJECTING ELECTRICAL ENERGY

BACKGROUND

Technical Field

The present invention relates to a method for injecting electrical energy and a device, in particular a wind power installation, for injecting the electrical energy.

Description of the Related Art

Nowadays, electric grids, which may be hereinafter also simply referred to as electric nets or electric networks, are increasingly supplied by regenerative sources of energy, such as wind power installations or wind farms exhibiting a different electrical behavior than common large-scale power plants, which employ at least one large-scale generator for injecting current. This means that such large-scale generators are being increasingly replaced with other injection units, such as cyclo-inverters. This is also referred to by experts as substitution. Countries like Germany, in particular, have a comparatively high degree of substitution, which means that comparatively many generators are replaced with other injection units. This may also have fundamental effects on the grid. The main concerns are that the possible balancing effects of the former injecting generators might be lost or at least weakened with an increasing degree of substitution.

This is why the proposed European Network Directive ENTSO-E provides for network operators to be able to demand an asymmetrical current injection. Here, the notion of symmetry or asymmetry relates to the correlation of the three phases of a three-phase grid to each other. Especially in the case of an asymmetrical disturbance in the grid, for example a short circuit between two phases or a short circuit of one phase to ground, it is provided to inject the electrical energy in as compensatory a manner as possible. A disturbance is to be assumed, in particular, if the actual voltage in the grid of at least one phase departs by more than 10% from its set point value and/or its rated value.

Initial objectives do exist, but they may not be reaching far enough.

The German Patent and Trademark Office has researched the following prior art in the priority application: DE 10 2006 054 870 A1; U.S. Pat. No. 7,423,412 B2; ANDERSSON, G.: Elektrische Energiesysteme—Vorlesungsteil Energieübertragung, p. 127-147, EEH—Power Systems Laboratory, ETH Zürich, September 2009; Symmetrische Komponenten, in Wikipedia, Die freie Enzyklopädie (Wikipedia, the free encyclopedia), Version of 23 Apr. 2012, URL: http://de.wikipedia.org/w/index.php?title=Symmetrische_Komponenten&oldid=102361863 [called up on 29 Jul. 2012].

BRIEF SUMMARY

One or more embodiments of the present invention are directed to improving grid quality or, at least, for making a contribution so that the grid quality does not become worse or significantly worse. It shall at least propose one alternative solution to already known concepts.

Hence, electrical current is injected into the three-phase grid by means of an injection unit at a grid connection point. In addition, an asymmetry is recorded in the grid, which can be done, in particular, by recording a negative sequence component. An asymmetrical current portion is injected into the grid in answer thereto, in order to compensate for at least part of the recorded asymmetry. In this context, it is proposed to inject this asymmetrical current portion such that the injection unit behaves like a consumer in the area of the so-called negative sequence. The targeted injection of the asymmetrical current portion, i.e. the targeted asymmetrical injection, takes place by means of a corresponding definition of such consumer. This type of solution is based on the idea of seeing the injection unit's behavior as part of the grid and considering it in the overall behavior of the grid.

The consumer is preferably referred to as impedance $\underline{Z}^-$ and defined by means of the following equation:

$$\underline{Z}^- = Z_n \frac{e^{j\varphi^-}}{k^-}.$$

Impedance $\underline{Z}^-$ is thus defined by the value of rated impedance $Z_n$, adjustment phase angle $\varphi^-$ and scalar adjustment factor $k^-$.

The value of rated impedance $Z_n$ can be defined through the following equation:

$$Z_n = \frac{V_n^2}{S_n}.$$

This value of impedance $Z_n$ is thus calculated from line voltage $V_n$, which here goes quadratically into the numerator, and from the injected apparent power $S_n$, which here goes in the denominator of the quotient. Solely by way of precaution, it is pointed out that $Z_n$ is referred to as the value of the rated impedance for the purpose of better illustration. For, in fact, the value of impedance $\underline{Z}^-$ does also depend on the adjustment factor $k^-$ and on the adjustment phase angle $\varphi^-$.

The value of the negative impedance can thus be adjusted via the adjustment factor $k^-$ and the adjustment phase angle $\varphi^-$, and is hence presettable as needed. It is moreover proposed to preset the adjustment phase angle as needed. The idea is thus to go further and to not merely provide, for example, a reactance, i.e., an impedance with an adjustment phase angle of 90° or, respectively, -90°, whereby the angle—like the amplitude—is also set as needed.

According to one embodiment, it is proposed to set the adjustment factor $k^-$ and the adjustment phase angle $\varphi^-$ of the impedance based on at least one net property. Thus, the specification or setting of such impedance is not only geared to current conditions within the grid, which is basically also referred to as a net to simplify matters, but it also takes into account net properties, i.e., properties of the grid. The voltage level in the grid, an existing asymmetry, or even a disturbance in the grid are examples of grid conditions. The grid reactance to resistance ratio, which is also referred to as the X/R ratio, is an example of a grid property. This and other net properties must be seen in particular in relation to the grid connection point. Therefore, such grid properties regularly also depend on the geographical position of the grid connection point, at any rate in relation to the grid concerned.

It is thus proposed to not only look at the current grid conditions but also at the grid properties.

The adjustment phase angle φ is preferably set within a range of 0°-90°. The bigger the grid reactance to resistance ratio at the grid connection point—i.e., the bigger the X/R ratio—the bigger such angle will be set. In the case of a large X/R ratio, for example in a range of 10-15, the adjustment phase angle may be set close to 90°. If that ratio is smaller, for example having a value of 2, the aforementioned angle may be proposed to be set in a range of 50°-60°. Hence, this grid property, which may be also a net feature, can be considered in addition to the conditions within the grid.

Preferably, an equivalent circuit diagram of the grid will be prepared for the injection point to serve as a basis for adjusting the consumer, in particular the impedance. In particular, the adjustment phase angle $\varphi^-$ and/or the adjustment factor $k^-$ will be adjusted based on the identified equivalent circuit diagram. Such equivalent circuit diagram, which in particular is supposed to reflect relevant grid properties, may even be prepared once or at least rarely at the grid connection point or in relation to the grid connection point. Such equivalent circuit diagram reflecting the grid properties thus is not subject to any, or is subject only to minor changes, like the described grid properties. In any event, the grid properties will basically change more rarely or slowly than the grid conditions.

The asymmetry of the grid is preferably identified by identifying or determining a grid negative sequence component of the voltage within the grid. This means that the voltages of the three phases are identified and broken down into a positive and negative sequence according to the method of symmetrical components. For the sake of completeness, it is pointed out that the zero sequence, which is also included in the theory of the method of symmetrical components, is to be regularly disregarded. Asymmetry thus can be easily considered by looking at the negative sequence component. According to one embodiment, it is moreover or additionally proposed that the asymmetrical current portion be specified or injected as a negative sequence component. A negative sequence component is thus not only used for measuring, but also for concrete injection or at least preset for injection.

An inverter is preferably used as an injection unit. At any rate, the injection unit comprises such an inverter and uses it to a significant degree for injecting the electrical energy. The use of such an injection unit allows for the injection of regeneratively generated electrical energy into the grid under consideration of grid requirements. By means of such an inverter, the current to be injected may be basically also adjusted dynamically according to value, frequency and phase. In this way, the inverter that is used as an injection unit may be set to exhibit the behavior of a consumer or to show impedance as a property, as desired.

Preferably, the proposed method also includes checking the grid for an asymmetrical system incident. Asymmetrical injection, as described in at least one of the above embodiments, is proposed in the case that no asymmetrical system incident has been detected. This means that the injection unit is to behave like a consumer, in particular impedance, if there is no asymmetrical system incident. These methods, as described, are hence provided in particular to consider—and especially enhance—grid quality during normal operation of the electric grid.

According to one embodiment, current is injected into a medium-voltage grid, and to this end the adjustment phase angle $\varphi^-$ is set to a value in the range of 40°-70°, in particular 50°-60°. When it comes to medium-voltage grids, one must reckon with a comparatively small XR ratio, for example in the range of 2. It is thus proposed to set a corresponding impedance that, due to the aforementioned adjustment phase angle, is better adapted to the nature of such a medium-voltage grid than when using a different adjustment phase angle, especially a larger adjustment phase angle.

What is further proposed is a wind power installation for injecting electrical energy generated from wind energy, which is prepared for the application of a method pursuant to at least one of the above-described embodiments. Such wind power installation for injecting current will, in particular, feature an inverter as an injection unit.

With such inverter or other injection unit, a counter current component is injected and thus the impedance of the negative sequence is specified.

BRIEF DESCRIPTION OF THE SEVERAL VIEWS OF THE DRAWINGS

The invention is described in more detail below based on embodiments with reference to the accompanying figures.

DETAILED DESCRIPTION

Figure 1:
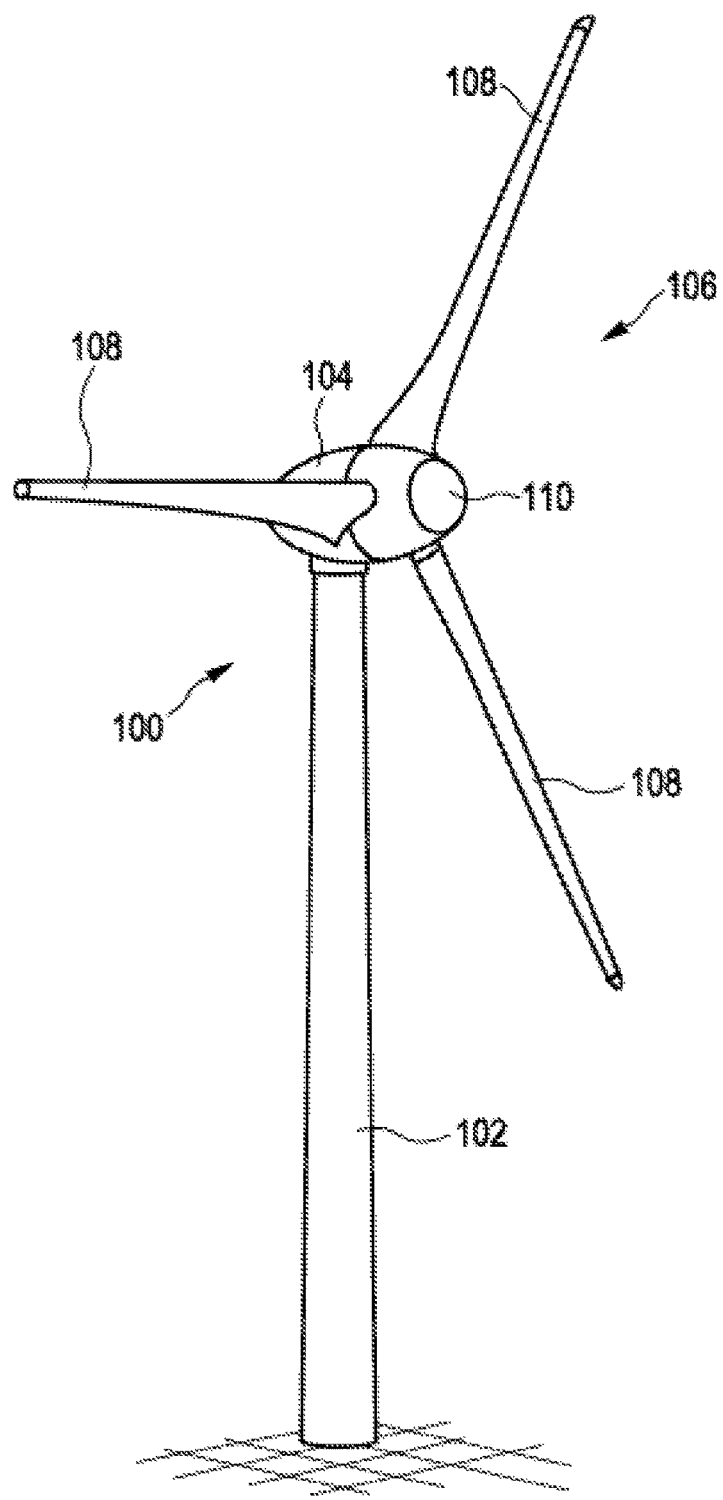
FIG. 1 shows a wind power installation in a perspective view.

FIG. 1 shows a wind power installation 100 with a tower 102 and a nacelle 104. A rotor 106 with three rotor blades 108 and a spinner 110 is located on the nacelle 104. When in operation, the rotor 106 is set into rotation by the wind and thereby drives a generator in the nacelle 104.

The following is explained with reference to FIGS. 2a, 2b and 2c.

The fundamental frequency content of voltages (and currents) is represented via phasors in symmetrical components $$v_a = \sqrt{2} V_a \cos(2\pi f t + \varphi V_a) \Rightarrow \underline{V}_a = V_a e^{j\varphi V_a}$$

$$v_b = \sqrt{2} V_b \cos(2\pi f t + \varphi V_b) \Rightarrow \underline{V}_b = V_b e^{j\varphi V_b}$$

$$v_c = \sqrt{2} V_c \cos(2\pi f t + \varphi V_c) \Rightarrow \underline{V}_c = V_c e^{j\varphi V_c}$$

and transformed as usual:

$$\begin{vmatrix} \underline{V}_0 \\ \underline{V}_+ \\ \underline{V}_- \end{vmatrix} = \frac{1}{3} \begin{vmatrix} 1 & 1 & 1 \\ 1 & e^{j\frac{2}{3}\pi} & e^{j\frac{4}{3}\pi} \\ 1 & e^{j\frac{4}{3}\pi} & e^{j\frac{2}{3}\pi} \end{vmatrix} \begin{vmatrix} \underline{V}_a \\ \underline{V}_b \\ \underline{V}_c \end{vmatrix}$$

The unbalancing level used as a metric for unbalancing is given by the ratio of the magnitudes of the negative respective zero and positive sequence phasor:

$$V_-/V_+ \text{ respectively } V_0/V_+$$

Grid connected inverters can be interpreted by typical (time and state dependent) equivalents with respect to fundamental frequency and (quasi-) steady state operation conditions. One option applicable for non-isolated operation conditions of the inverter is an impedance equivalent (FIG. 2a). Due to the vector group of the transformer in the test power system a zero sequence equivalent is not of relevance for the inverter operated. The positive sequence impedance is determined by the standard power control layer of the inverter FACTS-control architecture, the negative sequence impedance is controlled by additional ACI-control (FIG. 2c).

Both sequence impedances influence the physical behavior simultaneously. They depend on actual terminal sequence voltages and the actual magnitude and reference of the currents of the inverters which are independently controlled for positive and negative sequence (FIG. 2b). Negative real parts of the impedances indicate injection of active power in the grid, for reactive power negative imaginary parts respectively. Interpretation of this representation is limited to non-isolated operation conditions of the inverter.

With respect to the magnitudes of the sequence-voltages the power exchange between inverter and grid during normal operation condition will be absolutely dominated by the positive sequence. Positive sequence impedance during normal operation condition therefore can be interpreted as consequence from actual total inverter-power and actual positive sequence terminal voltage.

Negative sequence impedance specified from independent ACI-considerations will be achieved via negative sequence inverter-currents depend on actual negative sequence terminal voltage. This functionality provides an additional ACI control-module which belongs therefore to the power control layer of the architecture of inverter-control applied (FIG. 2 right). Vector control generates the input signal for PWM-control as usual.

The abbreviation ACI stands for "Asymmetrical Current Injection". Solely by way of precaution, it is pointed out that FACTS stands for "Flexible AC Transmission System," a term also commonly used in German language professional circles.

Figure 2A:
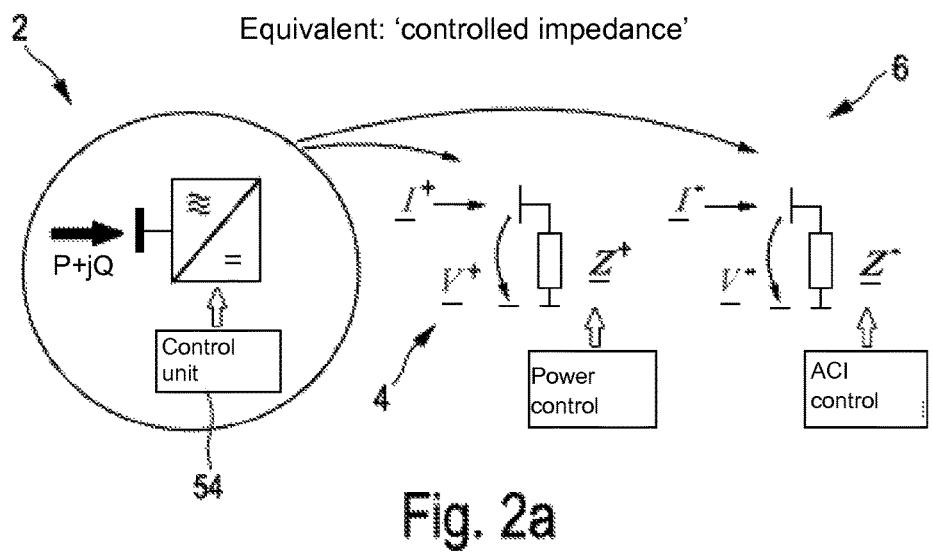
FIGS. 2a to 2c explain the concept of asymmetrical current injection.

FIG. 2a hence illustrates the layout of the control unit of an inverter 2 according to one embodiment such that it is broken down into the control and injection of portion 4 in the positive sequence and the control and thus injection of portion 6 in the negative sequence. This means that, for the positive sequence, an impedance $\underline{Z}^+$ is controlled, which has a real portion that is negative and which can be defined by the values $\underline{I}^+\underline{V}^+$. Accordingly, the negative sequence uses the impedance $\underline{Z}^-$ and thus the electrical values $\underline{I}^-\underline{V}^-$.

Figure 2B:
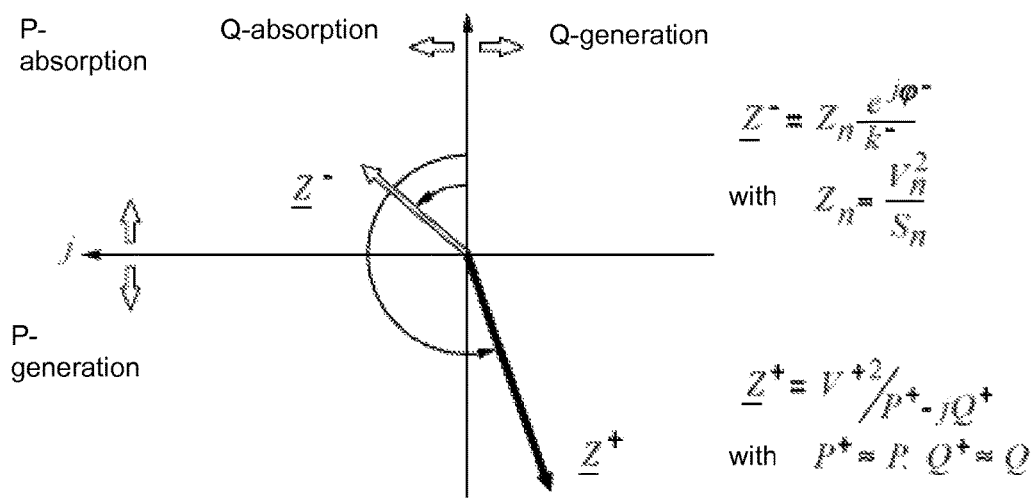

The meaning of these two impedances $\underline{Z}^+$ and $\underline{Z}^-$ is shown on a complex level in the diagram of FIG. 2b.

Figure 2C:
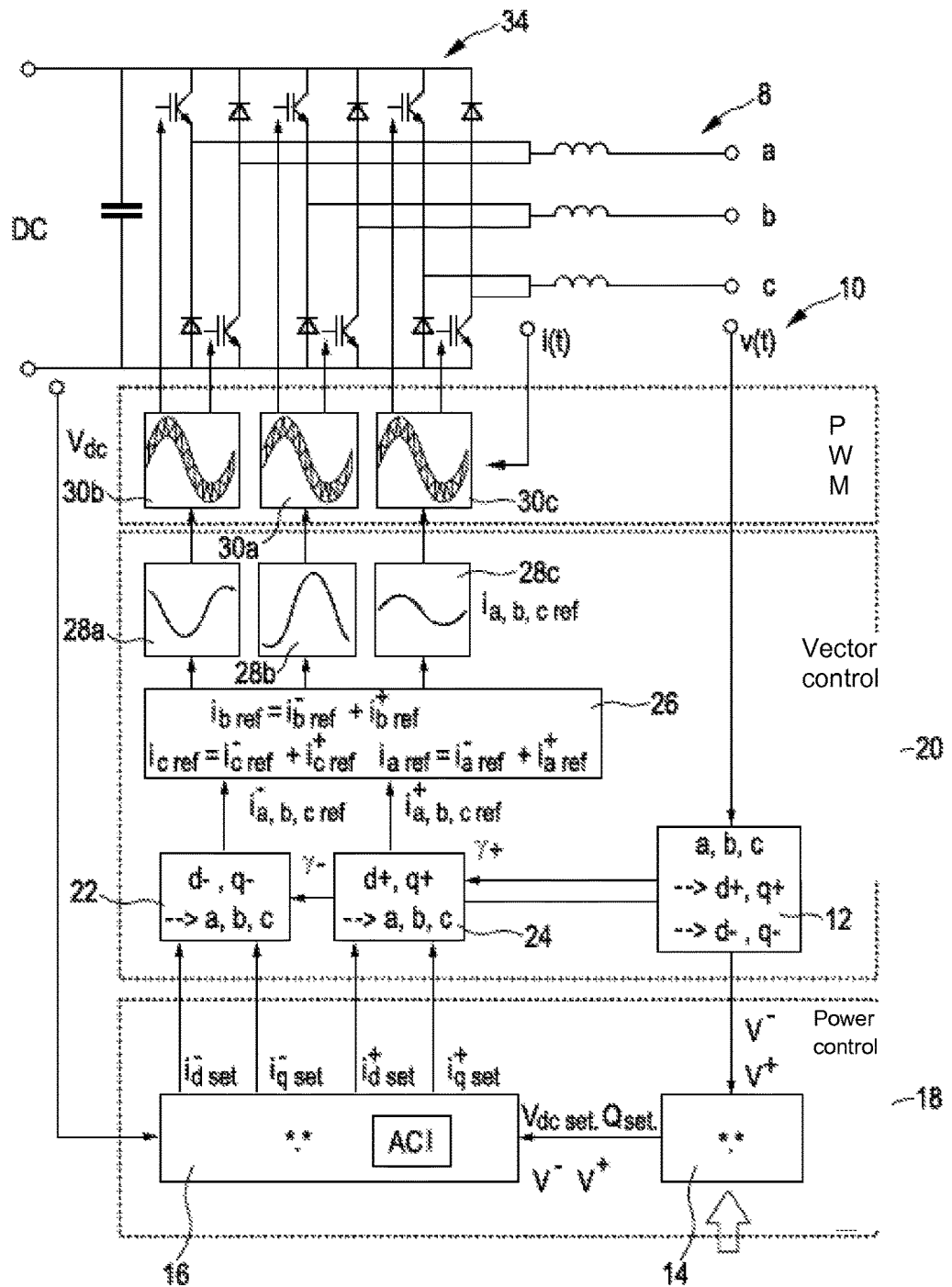

FIG. 2c shows by means of a wiring diagram, part of which is shown as a block diagram, how injection takes place according to one embodiment.

At the three-phase grid 8, which has phases marked with letters a, b and c, the voltage v(t) of all three phases is recorded at measuring point 10 and supplied to breakdown block 12. Breakdown block 12 breaks down the thus recorded three-phase system into the positive sequence component of voltage $v^+$ and the negative sequence component of voltage $v^-$. The result, along with the positive and negative sequence components of the voltage, is delivered to injection default block 16 via yet another calculation block 14, which determines required values, such as the reactive power Q. Injection default block 16 then determines the positive and negative sequence portions that are to be injected of the current that is to be injected, and to this end determines a d-portion and a q-portion each for the positive sequence current and for the negative sequence current. This may be also indicated in abbreviated form as d−, q−, d+ and q+. Information on the DC link voltage Vdc may also be delivered to injection default block 16. Calculation block 14 and, in particular, injection default block 16 thus form power control block 18.

The values gathered from power control block 18, in particular from injection default block 16, are supplied to vector control block 20, which in negative sequence block 22 or, respectively, in positive sequence block 24 determines the corresponding vectors for controlling the respective phase to be injected. In addition, negative sequence block 22 and positive sequence block 24 exchange information with breakdown block 12. To this end, conversion block 26 converts the two vectors of the positive and negative sequence of the current to be injected into the concrete parameters of the phase currents to be injected and supplies this information to phase blocks 28a, 28b or, respectively, 28c. To this end, block 26 determines the individual currents $i_{aref}$, $i_{bref}$ or, respectively, $i_{cref}$ pursuant to the following calculation: $i_{aref}=i-_{aref}+i+_{aref}$; $i_{bref}=i-_{bref}+i+_{bref}$ or, respectively, $i_{cref}=i-_{cref}+i+_{cref}$. These values are then delivered to tolerance band control blocks 30a, 30b or, respectively, 30c in inverter block 32. Tolerance band control blocks 30a, 30b or, respectively, 30c then perform concrete actuation of the inverter bridges of inverter 34 via a known tolerance band control and may, in the process, consider the actual current i(t).

Figure 3:
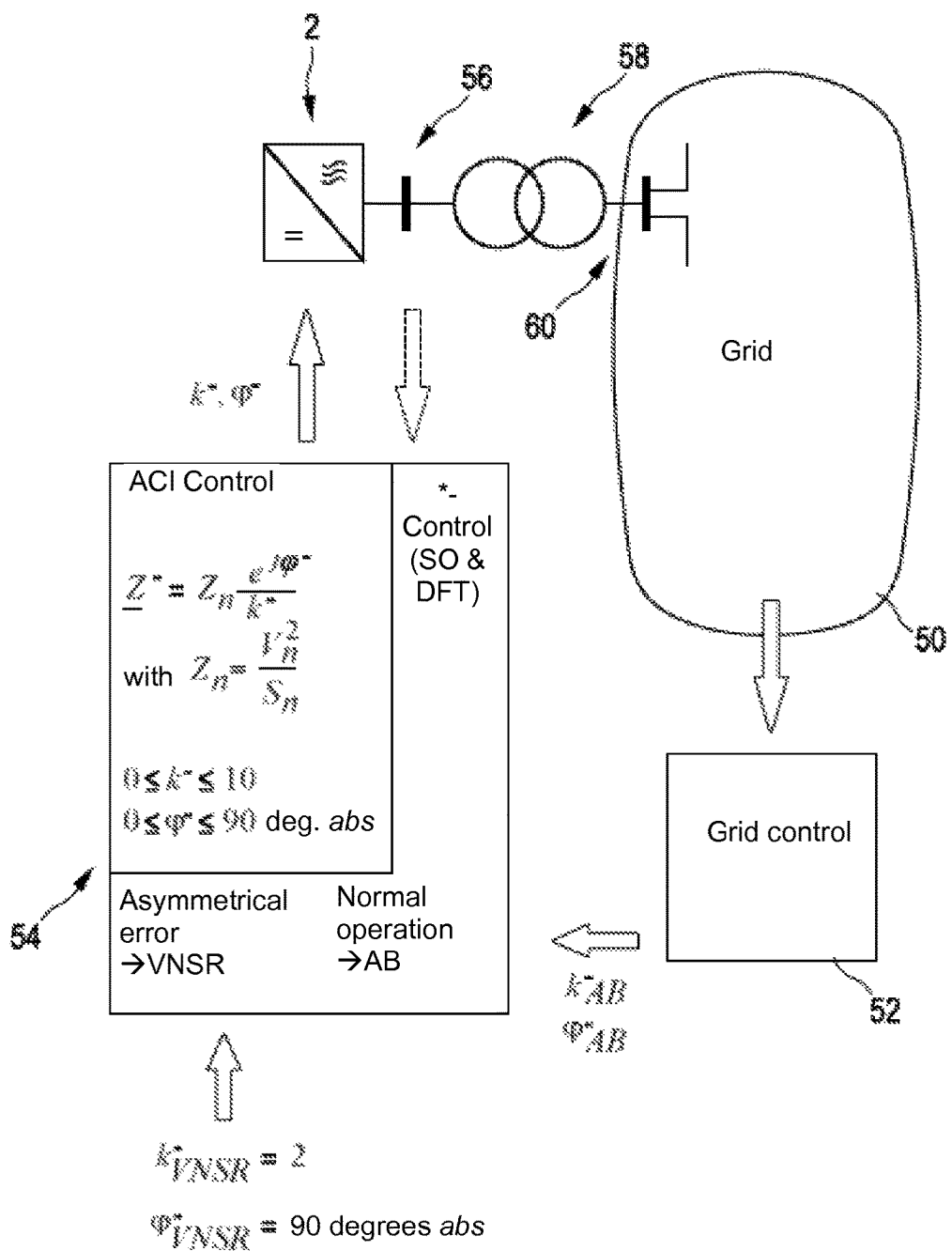
FIG. 3 explains the proposed injection method according to one embodiment.

FIG. 3 shows grid 15 as the starting point of control according to one embodiment. Grid 50 acts in particular through measurements onto a very general control, which is marked as grid control block 52. In order to adjust an impedance $\underline{Z}^-$, such general grid control may specify values for the adjustment factor $k^-$ or, respectively, $k_{AB}^-$ and for the adjustment phase angle $\varphi^-$ or, respectively, $\varphi_{AB}^-$. Here, index AB means normal operation of grid 50, i.e., operation without any system incidents. But there may be certain asymmetries.

FIG. 3 also suggests that in the case of an asymmetrical disturbance, a constant value, such as 2, is set for adjustment factor $k^-$ or, respectively, $k_{VNSR}^-$. In such case, an absolute value of 90° is specified for adjustment phase angle $\varphi^-$ or, respectively, $\varphi_{VNSR}^-$. VNSR here means "Voltage Negative Sequence Reactance," whereby for the negative sequence a reactance is specified in the case of a disturbance. In such case of an asymmetrical disturbance in the grid, no variable adjustment phase angle $\varphi^-$ is used; instead, a pure reactance is applied as a consumer.

Inverter control block 54 controls inverter 2 accordingly. Here, inverter 2 corresponds to that in FIG. 2a, and reference sign 54 for an inverter control block 54 has also been used in FIG. 2a. However, FIG. 2a and FIG. 3 are schematic illustrations and may differ in terms of their details.

The controlling of inverter 2 by inverter control block 54, as shown in FIG. 3, comprises various control processes, and reference is therefore again made to the control process explained in FIG. 2c. However, when it comes to illustrating the aspect of how the impedance is specified, FIG. 3 illustrates only the delivery or rather action of adjustment factor $k^-$ and adjustment phase angle $\varphi^-$ onto inverter 2. But inverter control is not limited to only specifying such values.

The dashed arrow also indicates a possible reaction of inverter 2 or of factors existing at inverter outlet 56 onto inverter control block 54 and thus onto the inverter control. Finally, inverter 2 releases a three-phase, asymmetrical current for injection at its inverter outlet 56 and injects it into grid 50 at grid connection point 60 via the illustrated transformer 58.

The invention claimed is:

1. A method for injecting electrical energy into an electrical grid, the method comprising:
   generating, by a generator of a wind power installation, the electrical energy from rotation of a rotor of the wind power installation;
   using an injection unit, injecting current to the grid at a grid connection point,
   detecting an asymmetry in the grid; and
   injecting an asymmetrical current portion into the grid to at least partially compensate for the detected asymmetry, wherein injecting the asymmetrical current portion occurs such that the injection unit behaves like a consumer having a negative sequence impedance.

2. The method according to claim 1, wherein detecting the asymmetry in the grid comprises detecting a negative sequence component in the grid, and wherein the consumer in the negative sequence impedance is described as an impedance $\underline{Z}^-$ with the correlation of $$\underline{Z}^- = Z_n \frac{e^{j\varphi^-}}{k^-},$$

where $Z_n$ describes the value of the impedance, $\varphi^-$ describes an adjustment phase angle and $k^-$ describes a scalar adjustment factor.

3. The method according to claim 2, further comprising adjusting the adjustment phase angle to a value in a range of 40°-70° and setting a value for the adjustment factor in a range of 0 to 10.

4. The method according to claim 2, wherein at least one of the adjustment factor $k^-$ and the adjustment phase angle $\varphi^-$ of the impedance are set based on at least one net property.

5. The method according to claim 2, wherein the adjustment phase angle $\varphi^-$ is set within a range of 0°-90°, wherein the greater a reactance to resistance ratio at the grid connection point, the greater the angle is set.

6. The method according to claim 1 further comprising preparing an equivalent circuit diagram of the grid at the grid connection point, and wherein an impedance describing the consumer is set based on the prepared equivalent circuit diagram.

7. The method according to claim 1, wherein detecting asymmetry in the grid comprises detecting a negative sequence component of the voltage in the grid.

8. The method according to claim 1, wherein the injection unit is or includes an inverter.

9. The method according to claim 1, further comprising determining whether there is an asymmetrical system incident in the grid.

10. The method according to claim 1, wherein detecting asymmetry in the grid comprises detecting a negative sequence component in the grid.

11. The method according to claim 1, wherein the injection unit behaves like the consumer by modeling a grid load.

12. The method according to claim 1, wherein the injection unit behaving like the consumer includes the injection unit being modeled by the negative sequence impedance.

13. A wind power installation for injecting electrical energy generated from wind energy into an electric grid, the wind power installation comprising:
    a tower;
    a nacelle located on the tower;
    a rotor rotatably coupled to the nacelle;
    at least one rotor blade coupled to the rotor; and
    a generator located in the nacelle, the generator configured to generate electrical energy from the rotation of the rotor, wherein the generator is electrically coupled to the electric grid by an injection unit, the injection unit being configured to:
    inject current to the grid at a connection point;
    detect an asymmetry in the grid; and
    inject an asymmetrical current portion into the grid to at least partially compensate for the detected asymmetry, wherein injecting the asymmetrical current portion occurs such that the injection unit behaves like a consumer having a negative sequence impedance.

14. The wind power installation according to claim 13, wherein the injection unit is an inverter.

* * * * *